UNITED STATES PATENT OFFICE 2,212,593

PROCESS FOR THE PRODUCTION OF ACETALDEHYDE FROM ACETYLENE

Egbert Dittrich, Neu Isenburg, near Frankfort-on-the-Main, Germany, assignor, by mesne assignments, to Chemical Marketing Company, Inc., New York, N. Y.

No Drawing. Application November 12, 1937, Serial No. 174,263. In Germany November 13, 1936

8 Claims. (Cl. 260—605)

This invention relates to a process for the production of acetaldehyde from acetylene.

It is known to produce acetaldehyde by passing acetylene together with water vapor over solid catalysts at elevated temperatures. Those catalysts used were the oxides or acetates of various heavy metals especially the zinc or the cadmium. Furthermore the use of different contact carriers like pumice stone, silica gel or activated charcoal was proposed. Sometimes these catalysts show a remarkable starting activity, but this activity diminishes after the course of a short time and drops down to a quite unsufficient degree.

It was now discovered, that excellent yields may be obtained, when using as catalysts activated charcoal with copper or its compounds, in quantities, however of not more than 1% related on the weight of the charcoal, and furthermore impregnated with phosphoric acid in quantities in excess, advantageously in great excess, of the combining weight with the metal. Very good yields are obtainable by the addition of copper amounting 0.1-0.5%, but in no case greater than 1%. The before mentioned addition may vary widely within the said range, according to the dimensions and activity of the activated charcoal. The amount of phosphoric acid may vary in a large degree, provided only that uncombined free phosphoric acid is present in the catalyst.

The use of copper as a catalyst for the hydration of acetylene is already known. When working according to these known process a substantial amount of acetylene however is transformed into cupren. This cupren penetrates through the contact mass within a short time in such a manner, that the contact chamber is wholly obstructed, whilst on the other hand the greatest part of the acetylene is in this way converted into a undesirable byproduct viz cupren. Therefore the use of copper catalysts was undesirable for the hydration of acetylene.

By the use of those catalysts which are the main feature of the present invention however excellent conversions and yields of very pure acetaldehyde may be obtained, whilst on the other hand the life time of the catalyst is essentially increased. It is most surprising, that the use of a small amount of copper within the range given does not at all cause a decrease of the catalyst's activity or life. On the contrary the starting activity is at least the same compared with catalysts of a higher copper content, while the life time is greatly increased. When using a catalyst comprising e. g. 10 g. copper on 100 g. charcoal, the contact chamber is wholly obstructed after the course of 1½ hours and therefore the reaction is finished. When the content of copper is decreased to 2.5 g. per 100 g. charcoal, the obstruction occurs practically within the same time. However, by the use of the catalysts according to the present invention and working under the same conditions, the process may be continued even for several weeks without any obstruction. By further decreasing the copper contact below the lower limit of the catalyst according to the invention, e. g. as far as 0.07 g. per 100 g. charcoal the catalytic activity is greatly diminished.

Contrary to this lowering of activity the decrease of the content of copper from 10 g. per 100 g. charcoal to the amount according to the present invention is not disadvantageous for the activity and life time of the catalysts.

According to the present invention activated charcoal is impregnated with compounds of copper and phosphoric acid and may be afterwards desiccated. It is not necessary, to use charcoal of any extreme activity. Activated charcoals of relatively lower activity may be used with excellent yields. The copper may be used as copper salts, like phosphate, acetate, nitrate, carbonate, in complex solution in ammonia etc. Besides copper other metals or compounds thereof may be used for impregnating the activated charcoal, e. g. silver, zinc, cadmium, tin, rare earths, metals exhibiting acidic characteristics, such as, uranium, tungsten, molybdenum, and vanadium.

Example 1

The catalyst consists of 100 g. activated charcoal, 0.5 g. copper acetate, 0.5 g. zinc oxide and 20 g. phosphoric acid (85%), the space velocity of acetylene was 75 liter per hour and per liter contact. The acetylene was passed over the catalyst together with 20 times of water vapor. By using a reacting temperature of 200-250°, 75-85% of the acetylene was converted. The reaction product consists substantially of acetaldehyde. Aceton, higher aldehydes and oils are only present in negligible quantities. The gaseous residue consists of 97% acetylene.

Example 2

Similar to Example 1 a 8% acetylene in methan was passed over the catalyst. The amount of water vapor was 15 times referred to the quantity of acetylene. At a reaction temperature of 350° the conversion of the acetylene is nearly quantitative in spite of the great space velocity amounting 750–850 l. gas per hour and per l. catalyst. The composition of the reaction product is quite similar to that obtained according to Example 1.

Further trials have proved that the catalysts according to the invention are especially very satisfactory in respect to the life time and activity, when passing acetylene together with water vapor with greater or extremely increased velocities over the catalyst. The proportion of water vapor and acetylene may vary within a wide range. Nevertheless, it is generally spoken advantageous to maintain the amount of vapor at least to such a degree, as to avoid a production of considerable amounts of undesired by products. It is a further advantage of the present process that not only acetylene of a high degree of purity must be used.

Gaseous mixtures which are relatively poor in acetylene and which contain greater quantities of methan, hydrogen, nitrogen etc. may be converted with excellent yields. The conversion obtainable when using the present catalysts amounts 3 times the conversion which was formerly obtainable.

Furthermore I have discovered that little amounts of oxygen or air have not at all a deleterious effect. On the contrary by these means the life time and activity of the catalysts may further be increased. It should be foreseen that additional oxygen should burn part of the acetylene. Nevertheless, the presence of little quantities of oxygen increases the life time and the activity of the catalysts without substantial burning acetylene. The addition of oxygen may be done in any manner. I prefer, to admix little quantities of oxygen continuously already at the beginning of the process.

*Example 3*

During a work time of a week 8100 liters acetylene per liter catalyst were treated similar to Example 1. 4200 liters acetylene remained unaltered. On the other hand the addition of 2.5 liter air per hour and per liter catalyst yielded under the same conditions and within the same work time the conversion of 6220 liters acetylene pro liter catalyst with a throughput of 8420 liters acetylene per liter catalyst. In this case the yield was increased from 19.2 kg. acetaldehyde per liter catalyst to 29.7 kg. per liter catalyst, and the conversion was increased from 52 to 74%.

What I claim is:

1. In a process for the production of acetaldehyde from gaseous mixtures containing acetylene by catalytic hydration, the improvement which comprises employing a catalyst comprising activated charcoal impregnated with 0.1% to 1.0% of copper calculated upon the weight of the activated charcoal, and a quantity of phosphoric acid sufficient that free phosphoric acid is present in the catalyst.

2. In a process for the production of acetaldehyde from gaseous mixtures containing acetylene by catalytic hydration, the step comprising passing a gaseous mixture containing acetylene and water vapor over a catalyst comprising activated charcoal impregnated with 0.1% to 1.0% of copper calculated upon the weight of the activated charcoal and a quantity of phosphoric acid sufficient that free phosphoric acid is present in the catalyst.

3. In a process for the production of acetaldehyde from gaseous mixtures containing acetylene by catalytic hydration, the step comprising passing a mixture of acetylene and water vapor over a catalyst comprising activated charcoal impregnated with 0.1% to 1.0% of copper calculated upon the weight of the activated charcoal and a quantity of phosphoric acid sufficient that free phosphoric acid is present in the catalyst.

4. In a process for the production of acetaldehyde from gaseous mixtures containing acetylene by catalytic hydration, the step comprising passing a gaseous mixture containing acetylene and water vapor over a catalyst comprising activated charcoal impregnated with 0.1% to 1.0% of copper calculated upon the weight of the activated charcoal and a quantity of phosphoric acid sufficient that free phosphoric acid is present in the catalyst in great excess of the metallic portion of the catalyst.

5. In a process for the production of acetaldehyde from gaseous mixtures containing acetylene by catalytic hydration, the step which comprises passing gaseous mixtures containing acetylene and water vapor over a catalyst comprising activated charcoal impregnated with .1% to .5% of compounds of copper calculated upon the weight of the activated charcoal, and a quantity of phosphoric acid sufficient that free phosphoric acid is present in the catalyst.

6. In a process for the production of acetaldehyde from gaseous mixtures containing acetylene by catalytic hydration, the step which comprises passing gaseous mixtures containing acetylene water vapor and a relatively small amount of free oxygen over a catalyst comprising activated charcoal impregnated with .1% to .5% of compounds of copper calculated upon the weight of the charcoal and a quantity of phosphoric acid sufficient that free phosphoric acid is present in the catalyst.

7. In a process for the production of acetaldehyde from gaseous mixtures containing acetylene by catalytic hydration, the step which comprises passing gaseous mixtures containing acetylene and water vapor over a catalyst comprising substantially one hundred parts of activated charcoal impregnated with .5 part of copper acetate, .5 part of zinc oxide and 20 parts of phosphoric acid (85%).

8. In a process for the production of acetaldehyde from gaseous mixtures containing acetylene by catalytic hydration, the step which comprises passing gaseous mixtures containing acetylene, water vapor, and a relatively small quantity of free oxygen over a catalyst comprising substantially one hundred parts of activated charcoal impregnated with .5 part of copper acetate, .5 part of zinc oxide and 20 parts of phosphoric acid (85%).

EGBERT DITTRICH.